UNITED STATES PATENT OFFICE.

CHARLES Y. BEACH, OF FAIRFIELD, CONNECTICUT.

MANUFACTURE OF RUBBER OR OTHER GUM CLOTH AND COMPOSITIONS THEREOF.

SPECIFICATION forming part of Letters Patent No. 223,874, dated January 27, 1880.

Application filed November 29, 1879.

*To all whom it may concern:*

Be it known that I, CHARLES Y. BEACH, of Fairfield, in the county of Fairfield and State of Connecticut, have invented new and useful Improvements in the Manufacture of Rubber or other Gum Cloth and Compositions thereof, of which the following is a specification.

This invention relates to the manufacture of rubber or other gum surfaced textile goods and fabrics.

In the ordinary process of manufacturing these goods the india-rubber or other gum, after having been ground and washed, is then charged with sundry mineral substances as mixers, and with sulphur for vulcanization, by placing the said substances upon the rubber or other gum and submitting the mass to pressure between rollers, the rolling operation being repeated and continued until the said substances have become thoroughly incorporated with the rubber or other gum. The rubber or other gum is next rolled into a very thin sheet and laid upon the surface of the cloth or fabric that is to be surfaced with the rubber or other gum, and both are then passed between heated rollers and subjected to such great pressure that the fabric and rubber or other gum are caused firmly to adhere. They are then submitted to the usual heating or vulcanizing process in a hot chamber until the sulphur acts sufficiently upon the rubber or other gum. Such, in brief, is the usual operation for producing an ordinary rubber or other gum surfaced cloth or fabric, which, when finished, has a smooth exterior surface.

If it is desired to produce a rubber or other gum surfaced cloth or fabric having a grained or pebbled surface, then in that case, after the rubber or other gum sheet has been pressed upon the cloth or fabric by rolling, as described, and before the same has been vulcanized, the said rubber or other gum covered cloth or fabric is passed between another set of rollers, one or more of which is made with indentations having the shapes of the graining or pebbling that it is desired to impart to the surface of the finished cloth or fabric, and when the fabric issues from these graining-rollers its surface will have been impressed with a corresponding ornamental graining or pebbling. The fabric is then finished by submission to the usual vulcanizing process before mentioned.

The rubber or other gum surfaced cloths and fabrics made in the foregoing manner are in general defective. Such goods, whether smooth-finished or grained, are apt, by use, to crack when creased or folded, and thus become useless. Another defect is that the graining or pebbling impressed upon their surfaces by the graining-rollers is more or less lost in the operation of vulcanization by the softening, melting, or flattening down of the grained or pebbled lines or elevations under the influence of the heat.

The object of my improvement is to overcome these difficulties and impart greater stability to rubber or other gum surfaced cloths and other fabrics, prevent damage thereto by cracking when creased or folded, and also to support and preserve, during the vulcanizing process, the pebbling or graining lines and elevations, so that they cannot break down, flatten, or become lost, as stated. This I accomplish in the following manner: To every pound of the combined rubber or other gum mixers and sulphur, when they have been made ready for rolling, as hereinbefore mentioned, I add one-tenth of a pound of some suitable fibrous material, preferably of an animal or vegetable nature, such as wool, hair, flax, or cotton. I prefer, in general, the use of cotton fiber, and one very convenient form thereof I find to be the material commonly known as "cotton batting." This fibrous material is incorporated with the rubber or other gum mixers and sulphur simply by being rolled along with them through the incorporating-rollers, as before described, and all the subsequent processes of making the rubber or other gum surfaced cloth or fabric are the same as those I have mentioned; but the result produced by the incorporation of the said fibrous substances with the rubber or other gum is greatly to improve the finished cloth or fabric, whether smooth-finished or grained, by binding the rubber or other gum surface, rendering the fabric stronger and less liable to crack when folded or creased in use. The fibrous material also supports and maintains the lines of the grained or pebbled fabrics during the process of vulcanization, preventing the breaking down, flattening, or loss of effect in the graining; and the finished pebbled goods made by the use of my improvement present a much superior and handsomer appearance than the same class of goods made in the common manner.

I do not confine myself to the precise proportions of fibrous material herein mentioned, as the same may be varied without departing from my invention.

Having thus described my invention, I claim as new and desire to secure by Letters Patent—

1. In the manufacture of rubber or other gum cloth, the intermixture, with the rubber or other gum compound, during the grinding process, of cotton or other fiber, substantially as described.

2. The composition for the manufacture of rubber or other gum cloth or fabrics, consisting of caoutchouc or other gum and cotton or other fiber, prepared by grinding together, substantially as specified.

3. A water-proofed fabric surfaced with an india-rubber or other gum compound in which is intermixed cotton or other fiber, substantially as described.

4. In the manufacture of grained or pebbled rubber or other gum cloth, the method herein described of preserving or supporting the grained surface during the vulcanizing process, substantially as herein set forth.

CHAS. Y. BEACH.

Witnesses:
CHAS. SEDGWICK,
J. H. SCARBOROUGH.